Dec. 16, 1952 J. R. MILLAR ET AL 2,621,712
SEAT CUSHION CONSTRUCTION
Filed Dec. 29, 1948 3 Sheets-Sheet 2

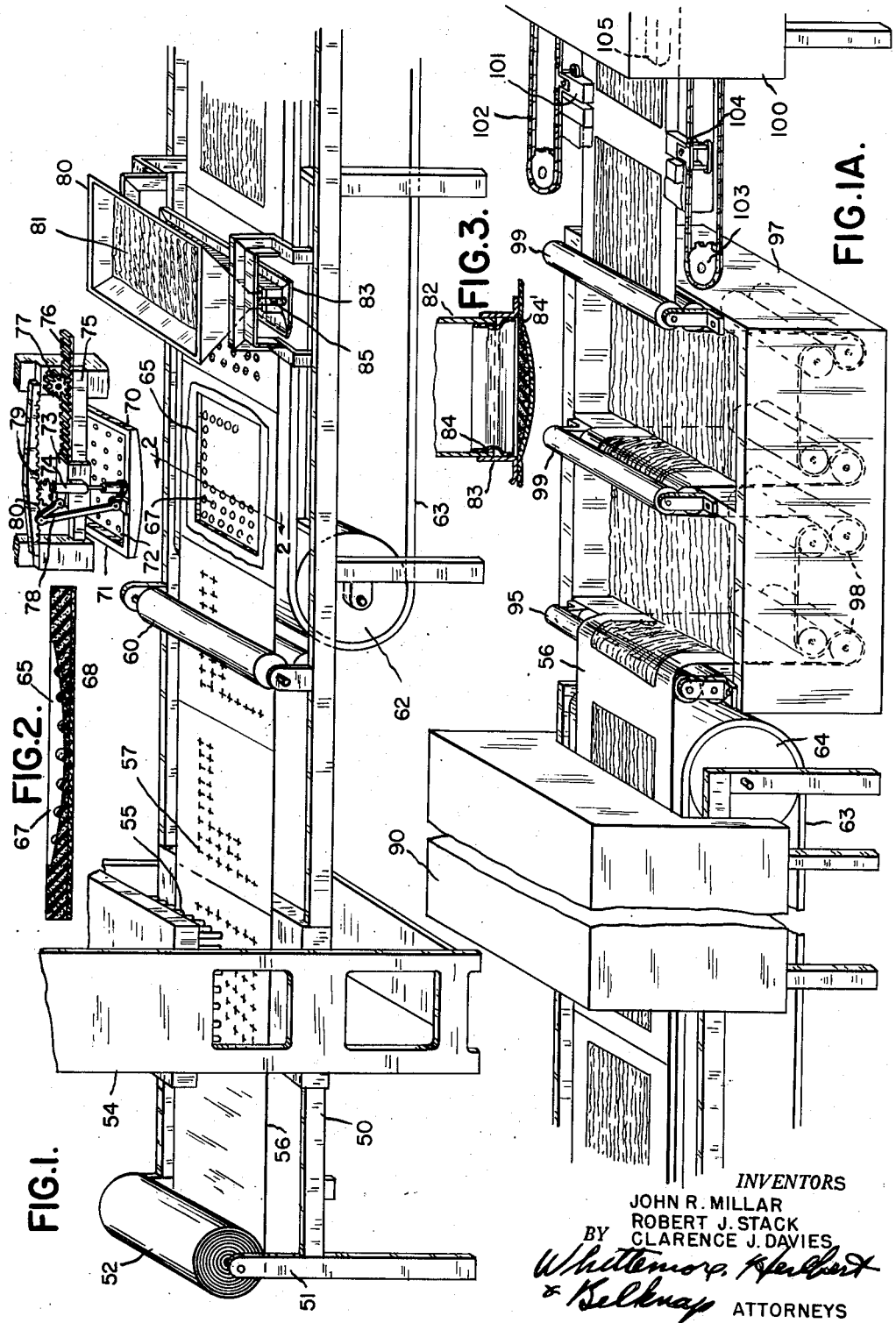

INVENTORS
JOHN R. MILLAR
ROBERT J. STACK
BY CLARENCE J. DAVIES

Whittemore, Hulbert
& Belknap
ATTORNEYS

Dec. 16, 1952 J. R. MILLAR ET AL 2,621,712
SEAT CUSHION CONSTRUCTION
Filed Dec. 29, 1948 3 Sheets-Sheet 3

INVENTORS
JOHN R. MILLAR
BY ROBERT J. STACK
CLARENCE J. DAVIES
Whittemore, Hulbert & Belknap
ATTORNEYS Patented Dec. 16, 1952

2,621,712

UNITED STATES PATENT OFFICE 2,621,712

SEAT CUSHION CONSTRUCTION

John R. Millar, Reno, Nev., and Robert J. Stack, Grosse Pointe, and Clarence J. Davies, Detroit, Mich., assignors to National Automotive Fibres, Inc., Detroit, Mich., a corporation of Delaware Application December 29, 1948, Serial No. 67,842

8 Claims. (Cl. 155—180)

The present invention relates to seat pads for automobile cushions and more particularly to a seat pad including a shaped ply of vulcanized foam rubber. The invention also includes the method of producing seat pads as well as a particular apparatus for carrying out the method in a continuous manner.

The advantages of seat cushions using foam rubber as a cushioning agent are well recognized; however, this material is relatively expensive. It is found that the most important advantages of foam rubber pads are retained if the foam rubber is provided in the form of a relatively thin ply at the top of a cushion structure. However, the fabrication of relatively thin plies of foam rubber, particularly where the pad has one or more feather edges, is difficult. It has been found that in attempting to remove such foam rubber pads from molds resulted in a relatively high proportion of scrap. Moreover, when pads having these relatively thin weak edges were successfully removed from the mold, it was necessary to bind the edges of the pad with an adhesively applied fabric or the like to prevent tearing of the edge during and after assembly in the seat.

According to the present invention the foam rubber is applied directly to a supporting fabric which is retained in a mold, and after the foam rubber has been vulcanized the fabric and foam rubber pad are removed as a unit. The fabric not only reinforces the rubber and facilitates its removal from the mold, but also serves as a mounting fabric in assembling the foam rubber into a seat cushion.

In order to further reduce the amount of foam rubber which is required to produce a pad and to improve the quality of resilience of the completed pad, the foam rubber is provided with a plurality of upwardly extending blind holes. In order to permit the shaping of the foam rubber in this manner, the fabric to which it is applied is provided with a corresponding plurality of holes through which mold cores extend. Preferably, the holes in the supporting fabric are provided by cross slitting the fabric, thus providing ears or tabs of fabric which are located inwardly of the pad by the mold cores during the forming operation. These tabs of fabric additionally reinforce the foam rubber cushion and serve as additional means for interconnecting the fabric and the rubber.

With the foregoing general remarks in mind it is an object of the present invention to provide an improved cushion which includes a relatively thin ply of vulcanized foam rubber and which exhibits the desirable qualities of foam rubber cushions at a substantially reduced expense.

It is a further object of the present invention to provide as a new article of manufacture, a reinforcing fabric having permanently bonded thereto a pad of vulcanized foam rubber whose thickness varies from a maximum intermediate its edges to a feather edge at at least one edge thereof.

It is a further object of the present invention to provide a foam rubber pad permanently bonded to a reinforcing backing fabric, the fabric and pad having registered holes at the under side of the pad which extend upwardly a substantial distance into the rubber.

It is a further object of the present invention to provide a seat cushion which is characterized by its high quality, its durability in service, and the economy with which it may be manufactured.

It is a further object of the present invention to provide a new method for the manufacture of foam rubber seat pads characterized by the fact that the rubber pad is permanently bonded during its manufacture to a reinforcing fabric, the reinforcing fabric serving to facilitate removal of the rubber pad from a mold so as to prevent injury to the fragile vulcanized foam rubber.

It is a further object of the present invention to provide a method for producing foam rubber seat pads in which a reinforcing fabric provided with a plurality of openings is caused to conform to the bottom of a mold having upwardly projecting cores which extend through the openings in the fabric, preferably in which the openings in the fabric are formed by crossed slits so as to provide attached tabs of fabric which are shaped upwardly so as to extend into the holes in the pad produced by the mold cores.

It is a further object of the present invention to provide apparatus for producing foam rubber pads on a continuous conveyor characterized by the automatic operation of the apparatus, the high degree of uniformity of product obtained, and the efficiency and economy with which large scale production may be accomplished.

Other objects and features of the invention will become apparent as the description proceeds, especially when taken in conjunction with the accompanying drawings, where:

Figure 1 and 1A together constitute a perspective view of the apparatus for making pads.

Figure 2 is a section on the line 2—2 of Figure 1.

Figure 3 is a fragmentary section through the foam rubber applicator.

In accordance with the present invention, seat assemblies such for example as for use in automobiles, are composed generally of a spring assembly, superimposed padding material such for example as cotton, over which is provided a relatively thin layer of foam rubber. The seat assembly is completed by covering the structure with upholstery material which normally is tacked at its edges to tacking strips provided at the under side of the seat assembly.

Figures 4 through 9 illustrate seat assemblies which vary somewhat in the make-up of the fibre padding material and also in the shape of the foam rubber pad.

Figure 4:
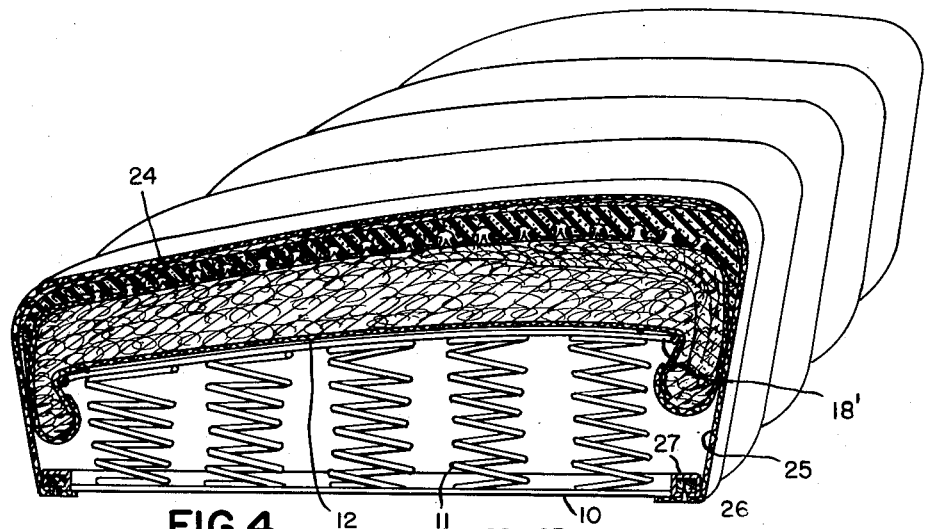
Figure 4 is a perspective view partly in section illustrating the assembly of the foam rubber pad into a seat assembly.
Figure 5:
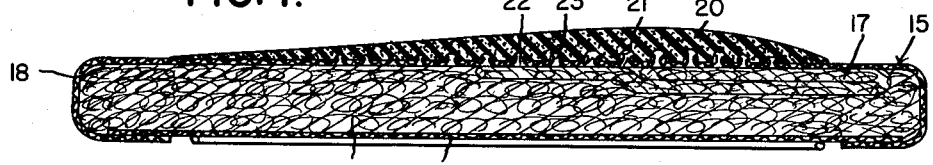
Figure 5 is a transverse section through the cushion pad assembly used in the seat assembly of Figure 4.

Referring first to Figures 4 and 5 there is illustrated a seat assembly comprising a spring frame 10, housing a plurality of coil springs 11, over the top of which is provided the usual spring insulator 12. The cushion pad assembly indicated generally at 15 is illustrated in Figure 5 and comprises fibrous padding material 16 which may be cotton or the like.

Figure 11:
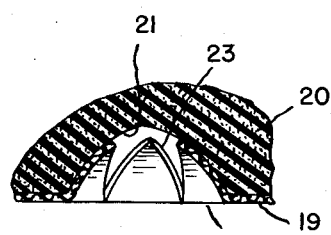
Figure 11 is an enlarged section showing the manner in which the reinforcing fabric extends into the line of holes at the under side of the foam rubber pad.

A separate folded cotton bat 17 is also included to provide extra padding at the forward edge of the border wire 18' of the spring. The fibrous padding material is contained in an envelope comprising an upper reinforcing fabric 18 and a lower fabric 19, the edges of which are permanently secured to the edges of the reinforcing fabric 18. Permanently united with the upper surface of the reinforcing fabric 18 is a foam rubber pad 20. As a result of the method of producing the foam rubber pad, rubber material at the under side of the pad is caused to penetrate into the interstices of the fabric so as to provide an especially tight bond between the parts. In addition the under side of the foam rubber pad is provided with a plurality of upwardly extending blind holes 21. The reinforcing fabric 18 has openings 22 therein which register with the openings in the foam rubber pad. As a result of a preferred method of producing these blind holes, attached tabs 23 of the fabric material extend upwardly and are permanently bonded to the foam rubber material at the sides of the blind holes 21. This detail of construction is best seen in Figure 11.

In assembling the seat assembly, the cushion pad assembly 15 is placed over the spring insulator 12. A thin layer of cotton wadding 24 is provided over the upper surface of the cushion pad assembly and thereafter the upholstery fabric 25 is applied over the cushion pad assembly and its edges are drawn down around the cushion pad assembly causing the cushion pad assembly to assume the form illustrated in Figure 4. The edges of the upholstery material 25 are secured as by tacking as indicated at 26, to tacking strips 27 provided at the lower edge of the spring assembly.

Figure 6:
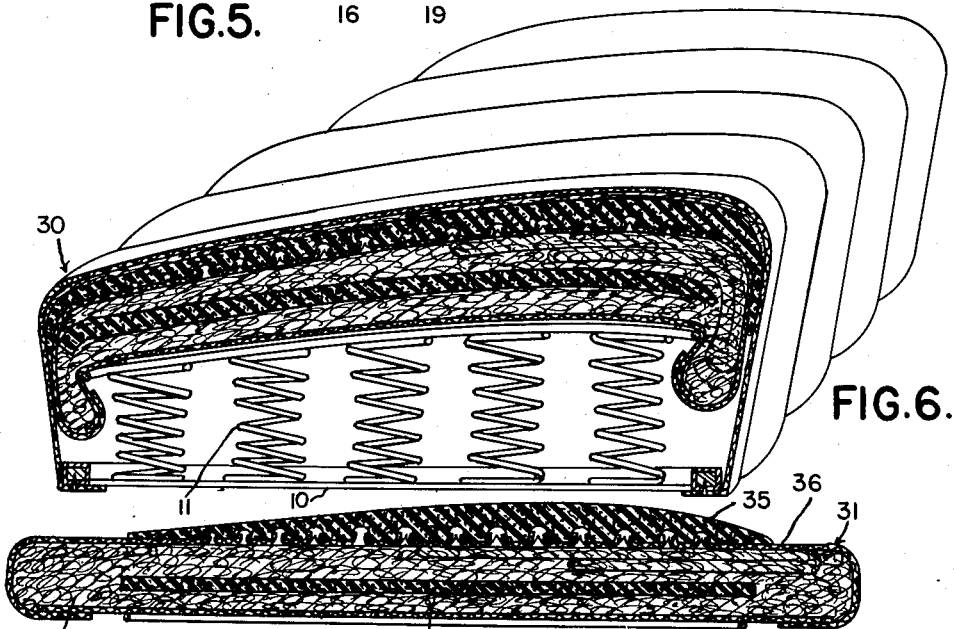
Figure 6 is a perspective view partly in section of a somewhat modified seat assembly.
Figure 7:
Figure 7 is a transverse section through the cushion pad assembly used in the seat assembly of Figure 6.

The construction illustrated in Figures 6 and 7 is generally similar and the description thereof will be limited only to the points of difference. In this case the seat assembly 30 comprises a cushion pad assembly 31 in which the padding material 32 includes a latex hair pad 33. The foam rubber pad 35 is permanently bonded to the reinforcing fabric 36 as in the embodiment previously described, and is of similar cross section.

Figure 8:
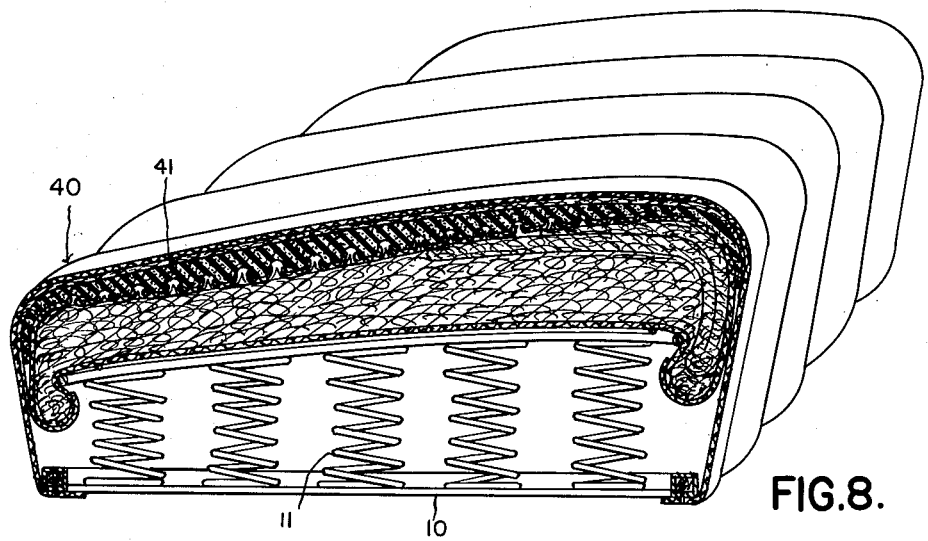
Figure 8 is a perspective view partly in section of a somewhat modified seat assembly.
Figure 9:
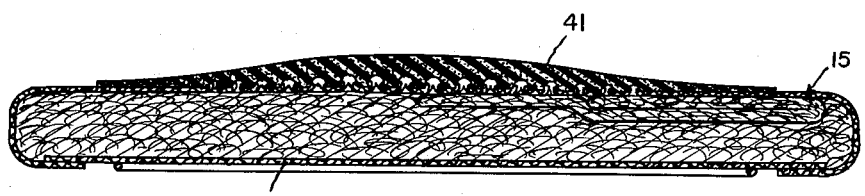
Figure 9 is a transverse section through the cushion pad assembly used in the seat assembly of Figure 8.

The seat assembly 40 illustrated in Figures 8 and 9 differs from the assembly shown in Figures 4 and 5 principally in the cross sectional shape of the foam rubber pad 41. In the embodiment illustrated in Figures 4 and 5 the thickest portion of the foam rubber pad 20 was located adjacent the forward edge of the seat assembly. In the embodiment illustrated in Figures 8 and 9 the thickest portion of the foam rubber pad 41 is located more nearly adjacent the rear of the seat assembly 40.

The apparatus for producing the foam rubber pad and constituting one means for carrying out the improved method of production is illustrated in Figures 1 to 3. The apparatus comprises an elongated table 50 including supporting posts 51 for supporting a roll 52 of a woven fabric such for example as burlap. Adjacent the supply roll 52 is a press 54 which includes cutting elements 55 designed to cut longitudinally spaced sets of holes in the advancing web of fabric 56. Preferably, these holes are formed by crossed slits as indicated at 57. Feed rolls 60 are provided for drawing the web of fabric from the roll 52. Just beyond the fed roll 60 is a roll 62 about which a traveling endless belt mold 63 is caused to advance. The endless belt mold is formed of a suitable heat resistant material and also a material which has sufficient flexibility to permit it to pass around rolls 62 and 64 while at the same time, it has sufficient strength to retain the mold form intermediate the rolls 62 and 64. In practice, a heat resistant silicone rubber is found to be useful in forming the endless belt mold and is preferably permanently attached to a canvas belt 68 (Fig. 2). Spaced along the endless belt mold are a plurality of depressed mold portions, one of which is indicated at 65. These mold portions have a cross sectional shape corresponding to the desired corresponding cross sectional shape of the foam rubber pad. In this position they are provided with a plurality of upstanding mold cores 67 which are designed to form blind holes in the under side of the foam rubber pad.

Mechanism is provided for depressing the fabric web into the mold forms 65 so as to cause a portion of the web to conform to the shape of the mold and further to cause the mold cores 67 to project upwardly through the openings 57 previously cut in the fabric web. To accomplish this result a presser 70 is provided which comprises a frame 71 and an apertured plate 72 having a plurality of openings therein corresponding in number and disposition to the mold cores 67 and the openings 57 previously formed in the fabric. The presser 70 is mounted for vertical movement with respect to a slide 73 by suitable guide means indicated at 74. The slides 73 are mounted for horizontal movement parallel to the direction of advance of the fabric web 56 on guide bars 75. Actuating racks 76 are connected to the slide 73 and are moved back and forth in timed relation to advance of the molds 65 by pinions 77. Means are provided for effecting vertical motion of the presser 70 in timed relation to advance of the molds 65 and this means comprises linkage indicated generally at 78 connected to an actuating pinion 79 in mesh with a rack bar 80. The parts are operated in timed relation to the advance of the molds 65 and operate in the following manner: The presser 70 is depressed while it is advanced synchronously with the web 56 and mold 65 into the mold depression. The openings in the plate 72 receive the mold cores 67 and press the material of the web 56 down and over the mold cores, by means of which the fabric is retained in the mold. The fabric thus becomes in effect, a liner for the mold for a purpose which will subsequently appear.

Subsequently the presser 70 is elevated while still advancing synchronously with the mold 65 and thereafter returns to its initial starting position. Suitable control mechanism is provided so that as each mold 65 advances beneath the presser assembly, the presser 70 is actuated to cause the fabric web to conform to the configuration of the mold.

The material subsequently advances beneath a trough or hopper 80, containing a supply of semi-liquid unvulcanized latex foam rubber indicated at 81. As best seen in Figure 3, the lower end of the trough 80 has a relatively narrow neck portion 82 extending transversely across the table 50. Telescopically received over the open bottom of the neck or nozzle 82 is a distributor 83 which is vertically slidable with respect thereto. In order to seal the distributor 83 and nozzle 82, a thin sheet of rubber membrane 84 is preferably provided, which is secured at its upper edge and overlaps the connection between the parts.

The right hand edge of the distributor 83 as seen in Figure 3, is provided with a sharp corner as indicated at 84', which acts as a scraper and prevents deposition of foam rubber onto the fabric except where the fabric is depressed into the molds 65. Compression springs 85 are provided urging the distributor 83 down into contact with the upper surface of the fabric 56. The telescopic arrangement between the distributor 83 and the nozzle 82 permits the passage of portions of the web of uneven thickness, as may occur where the end of one web is connected to the end of a new roll of material.

After the material has passed the hopper 80 it is in the form of a continuous web, portions of which are depressed into molds, which molds are filled with semi-liquid unvulcanized latex rubber. The conveyor then advances the material into a curing oven 90 in which the foam rubber is vulcanized by the application of heat. Any suitable or convenient supply of heat may be employed to effect the vulcanization, such for example as heated air caused to flow through the oven 90, or if preferred dielectric heating may be used. As the material leaves the oven 90 the web 56 is caused to pass over a stripper roll 95 while the endless belt mold 63 passes over the roll 64. It may be mentioned at this time that the foam rubber pad is relatively thin and is tapered at one side to what may be defined as a feather edge. Inasmuch as the rubber pad is at this time vulcanized to the fabric web 56, removal of the structure from the mold is accomplished without subjecting the relatively fragile foam rubber pad to substantial stresses. Since the latex foam rubber was applied to the fabric in semi-liquid form, it will have penetrated the interstices of the woven fabric so that a very tight vulcanized bond is effected between the fabric and the pad.

The stripper roll 95 is located adjacent a washing and rinsing tank 97 in which the foam rubber pad is repeatedly rinsed. Preferably pairs of squeezing rolls 98 and 99, are provided as shown, the rolls 98 being located adjacent the bottom of the tank and the rolls 99 being located above the level of liquid in the tank. Water may be employed in washing the foam rubber pads and the passage of pads through the rolls has the effect of thoroughly cleaning the pads. If desired, the material may be given an additional step of cleaning by a spray operation (not shown).

Following the washing of the pad the material is advanced through a drying oven 100. In order to prevent shrinkage of the fabric web during drying a plurality of traveling tentering clips 101 are provided on endless chain 102 traveling around sprocket 103. The tentering clips are pivoted as indicated at 104 and are provided with projections on their under surface for engaging the edges of the fabric web 56. As the individual clips enter the drying oven 100 they engage the under surface of cams 105 which press the clips firmly against the fabric web. The tentering clips are retained against lateral movement and thus effectively prevent shrinkage of the fabric during its advance through the drying oven.

If desired, automatic means may be provided for severing the web as it advances from the drying oven so as to separate the foam rubber pads. It will be observed that each foam rubber pad is thus provided on a reinforcing backing fabric which in turn extends beyond the edges of the foam rubber pad and is used to form a portion of the envelope for receiving fibrous padding material. The backing is cut transversely of the strip between the areas covered by the foam rubber as shown in the drawing, resulting in individual pads of fabric backed foam rubber in which the fabric area is larger than the rubber pad thus providing a marginal skirt on all sides for attachment at assembly.

It will of course be appreciated that the exact shape and size of the molds provided in the belt 63 may be as desired and that in like manner, the number, size and arrangement of blind holes provided at the under side of the rubber pad may be selected to control the resilient properties of the completed pad.

Figure 10:
Figure 10 is a transverse section through a reinforced foam rubber pad as it comes from the mold.

Referring now to Figure 10 there is illustrated the appearance of the reinforced rubber pad as it comes from the assembly line. In this case it will be observed that the fabric 56 is illustrated as retaining the configuration of the mold and the upper surface of the rubber pad, designated here as 107, is flat. However, when the fabric 56 is tensioned to form the upper portion of the envelope, the upper surface of the rubber pad 107 assumes a curvature corresponding generally to the cross section of the mold.

In accordance with the present invention the foam rubber pad occupies the interstices of the reinforcing fabric so that the two in effect become an integral part. Since the fabric is provided in effect as a reinforcement for the pad and as a lining for the mold, removal of the pad from the mold is accomplished with a maximum of ease and a minimum of waste. Moreover, since the foam rubber pad is thus provided with a reinforcing fabric, the necessity of binding the relatively thin and weak edges of the pad is avoided. The present pad results in covering the entire cushion with a thickness of rubber determined by the requirements. In other words, the rubber is thick where it is required for resilience and is relatively thin where the maximum resilience is not required; thus waste of rubber is avoided. The present method in which the reinforcing fabric and rubber pad are produced as a unitary part avoids the step of reinforcing the rubber pad after its formation and thus eliminates what has previously been an unnecessary and expensive extra step.

It will of course be appreciated that the use of the flexible fabric web 56 as an aid to stripping or separating the vulcanized rubber pad from the mold, does not depend upon the web being a woven fabric. Such web can be formed of any suitable flexible sheet material. Thus if it is not desired to provide the completed pad with a backing of fabric, then flexible sheet material such for example as paper or any suitable substitute therefor, plastic sheeting or the like, or even wire mesh may be employed. In any case, the flexible sheet material will be employed to strip or separate the rubber pad from the mold, which it will do without damage to any part of said pad, including the tapered feather edge thereof. It will of course be obvious that the flexible sheet material may be wider than the mold as illustrated in the drawings, or it may be the same width as the mold, or it may be narrower than the mold. While in the embodiment illustrated and described in detail the backing fabric is illustrated as wider than the mold, this is for the reason that in the illustrated embodiment the pad is to be assembled into a seat cushion. Thus in this instance the fabric webbing is strong enough to serve as a reinforcement for the pad when the latter is applied to the padding of a seat cushion. However, the invention is not limited to the production of seat cushions or to the automotive field. Obviously the invention could be used in other fields, for example in the construction of mattresses or other cushion assemblies where pads of this type may be desired and in many cases, as will be obvious, it may be desirable to produce a rubber pad which in final form need not be provided with a reinforcing backing.

The present method results in rapid production of reinforced foam rubber pads which are of uniform high quality. It substantially eliminates waste due to scrap and it further reduces the subsequent steps of handling the pad to a minimum. As a consequence seat cushions are produced which are equivalent in quality to previously known foam rubber cushions and which may be produced with greatly increased efficiency and therefore lower costs.

The drawings and the foregoing specification constitute a description of the improved seat cushion construction and method and apparatus for making the same, in such full, clear, concise and exact terms as to enable any person skilled in the art to practice the invention, the scope of which is indicated by the appended claims.

What we claim as our invention is:

1. A seat pad for vehicle cushions designed to be interposed between a spring construction and upholstery fabric and to be retained in place on the spring construction by attachment of the upholstery fabric to the spring construction, comprising a fabric envelope shaped to overlie the top and sides of a spring assembly, fibrous padding material in said envelope, and a pad of vulcanized foam rubber permanently attached to the outer upper surface of said envelope.

2. A seat pad for vehicle cushions designed to be interposed between a spring construction and upholstery fabric and to be retained in place on the spring construction by attachment of the upholstery fabric to the spring construction, comprising a fabric envelope shaped to overlie the top and sides of a spring assembly, fibrous padding material in said envelope, and a pad of vulcanized foam rubber permanently attached to the outer upper surface of said envelope, the edges of said foam rubber pad tapering to a feather edge and being vulcanized to the fabric.

3. A seat pad for vehicle cushions designed to be interposed between a spring construction and upholstery fabric and to be retained in place on the spring construction by attachment of the upholstery fabric to the spring construction, comprising a fabric envelope shaped to overlie the top and sides of a spring assembly, fibrous padding material in said envelope, and a pad of vulcanized foam rubber permanently attached to the outer upper surface of said envelope, the under side of said foam rubber pad having a plurality of upwardly extending holes into which the adjacent portions of the fabric envelope extend and are secured therein.

4. A seat pad for vehicle cushions designed to be interposed between a spring construction and upholstery fabric and to be retained in place on the spring construction by attachment of the upholstery fabric to the spring construction, comprising a fabric envelope shaped to overlie the top and sides of a spring assembly, fibrous padding material in said envelope, and a pad of vulcanized foam rubber permanently attached to the outer upper surface of said envelope, the edges of said foam rubber pad tapering to a feather edge and being vulcanized to the fabric, the under side of said foam rubber pad having a plurality of upwardly extending holes into which the adjacent portions of the fabric envelope extend and are secured therein.

5. A seat pad for vehicle cushions designed to be interposed between a spring construction and upholstery fabric and to be fastened in place on the spring construction by attachment of the upholstery fabric to the spring construction and to be retained in place on prising a fabric envelope shaped to overlie the top and sides of a spring assembly, fibrous padding material in said envelope, and a pad of vulcanized foam rubber permanently attached to the outer upper surface of said envelope, the edges of said foam rubber pad tapering to a feather edge and being vulcanized to the fabric, the underside of said foam rubber pad having a plurality of upwardly extending holes, portions of the fabric envelope at the underside of the pad which would normally register with the bottoms of said holes being cut into tabs, said tabs extending upwardly into the holes and the foam rubber at the sides of said holes and adjacent the lower ends thereof being vulcanized to said tabs.

6. A seat pad for vehicle cushions designed to be interposed between a spring construction and upholstery fabric and to be retained in place on the spring construction by attachment of the upholstery fabric to the spring construction, comprising a fabric envelope shaped to overlie the top and sides of a spring assembly, fibrous padding material in said envelope, and a pad of vulcanized foam rubber permanently attached to the outer upper surface of said envelope, the edges of said foam rubber pad tapering to a feather edge and being vulcanized to the fabric, the underside of said foam rubber pad having a plurality of upwardly extending holes, the portion of the fabric envelope at the bottom of the pad being formed of an open weave fabric, portions of said fabric which would normally register with the bottoms of said holes being cut into tabs, said tabs extending upwardly into the holes and the foam rubber at the sides of said holes penetrating the interstices of the open weave fabric of said tabs and being vulcanized thereto.

7. A new article of manufacture comprising a backing sheet of a relatively strong flexible material, a pad of vulcanized foam rubber vulcanized to said backing sheet, said pad having at least one edge portion tapered to form a very thin feather edge, said feather edge being so thin as to be readily torn, the backing sheet extending beyond the said feather edge of said pad.

8. A new article of manufacture comprising a pad of vulcanized foam rubber having one surface thereof substantially smooth and the opposite side provided with a plurality of blind holes extending into said pad and terminating short of the smooth side thereof, a backing fabric vulcanized to the side of said pad provided with the blind holes, the portions of the fabric which would normally overlie said holes being cut along lines intersecting generally centrally of the holes to form a plurality of separate tabs, said tabs extending into said holes in contact with the sides of said holes and with the edges of said tabs laterally separated from each other, the foam rubber at the sides of said holes being vulcanized to said tabs.

JOHN R. MILLAR.
ROBERT J. STACK.
CLARENCE J. DAVIES.

REFERENCES CITED

The following references are of record in the file of this patent:

UNITED STATES PATENTS

| Number | Name | Date |
|---|---|---|
| 378,369 | Hyer | Feb. 21, 1888 |
| 1,608,727 | Dickey | Nov. 30, 1926 |
| 1,864,514 | Bank | June 28, 1932 |
| 2,204,622 | Reid | June 18, 1940 |
| 2,231,346 | Reising et al. | Feb. 11, 1941 |
| 2,271,058 | Binns | Jan. 27, 1942 |
| 2,307,201 | Cunningham | Jan. 5, 1943 |
| 2,308,964 | Saurer | Jan. 19, 1943 |
| 2,441,235 | Blair et al. | May 11, 1948 |